United States Patent [19]

Johnson et al.

[11] Patent Number: 4,941,198
[45] Date of Patent: Jul. 10, 1990

[54] COMMUNICATIONS REPEATER MONITORING SYSTEM

[75] Inventors: Edward R. Johnson; Ladan A. Parandoosh, both of Sunnyvale; Joseph F. Lutz, San Jose, all of Calif.

[73] Assignee: Peninsula Engineering Group, Inc., San Carlos, Calif.

[21] Appl. No.: 120,529

[22] Filed: Nov. 12, 1987

[51] Int. Cl.$^5$ .................. H04B 1/60; H04B 17/02
[52] U.S. Cl. .................................. 455/9; 455/67; 370/13.1; 370/110.1; 370/110.4; 375/3.1
[58] Field of Search .............. 455/9, 10, 12, 13, 115, 455/17, 67, 11, 52; 370/13.1, 110.1, 110.4; 375/3, 3.1

[56] References Cited

U.S. PATENT DOCUMENTS

| | | | |
|---|---|---|---|
| 3,302,113 | 1/1967 | Clay | 455/9 X |
| 3,860,870 | 1/1975 | Furuya | 455/9 X |
| 4,228,538 | 10/1980 | Scharla-Nielsen et al. | 455/12 X |
| 4,491,968 | 1/1985 | Shimp et al. | 455/67 |
| 4,499,600 | 2/1985 | Powell et al. | 455/9 |

Primary Examiner—Benedict V. Safourek
Assistant Examiner—Ralph Smith
Attorney, Agent, or Firm—Edward B. Anderson

[57] ABSTRACT

A monitoring and alarm system for a radio frequency microwave communications repeater unit. A plurality of signals representative of the status of a corresponding plurality of operating conditions of the repeater unit are simultaneously generated. The signals are time multiplexed to form a combined signal. The combined signal is encoded to form a digital signal of frames of data having a frequency substantially less than the communication signal carrier frequency and preferably less than the communication modulating signal frequency, with a frame being formed of data from each of the status signals. A variable attenuator is responsive to the digital signal for varying the level of the communication signal proportionally with the value of the digital signal. The level-varied communication signal is then retransmitted. At a receiver unit for receiving the retransmitted communication signal there is an automatic gain control circuit responsive to the signal level of the received retransmitted communication signal for generating a control signal indicative of the level of the received communication signal. The digital signal is regenerated from this control signal and is decoded into a plurality of output signals corresponding to and representative of the original operating-condition-status signals.

11 Claims, 11 Drawing Sheets

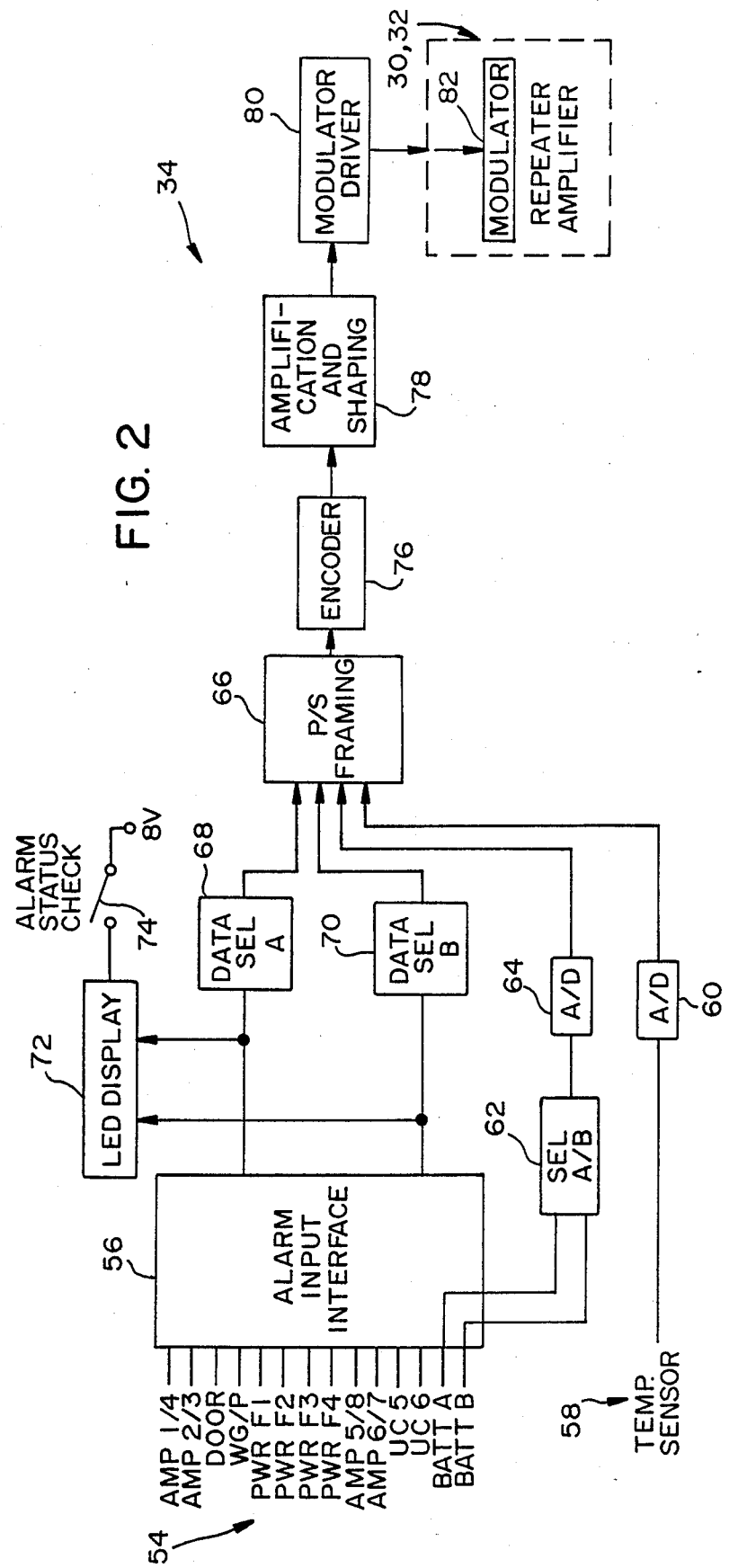

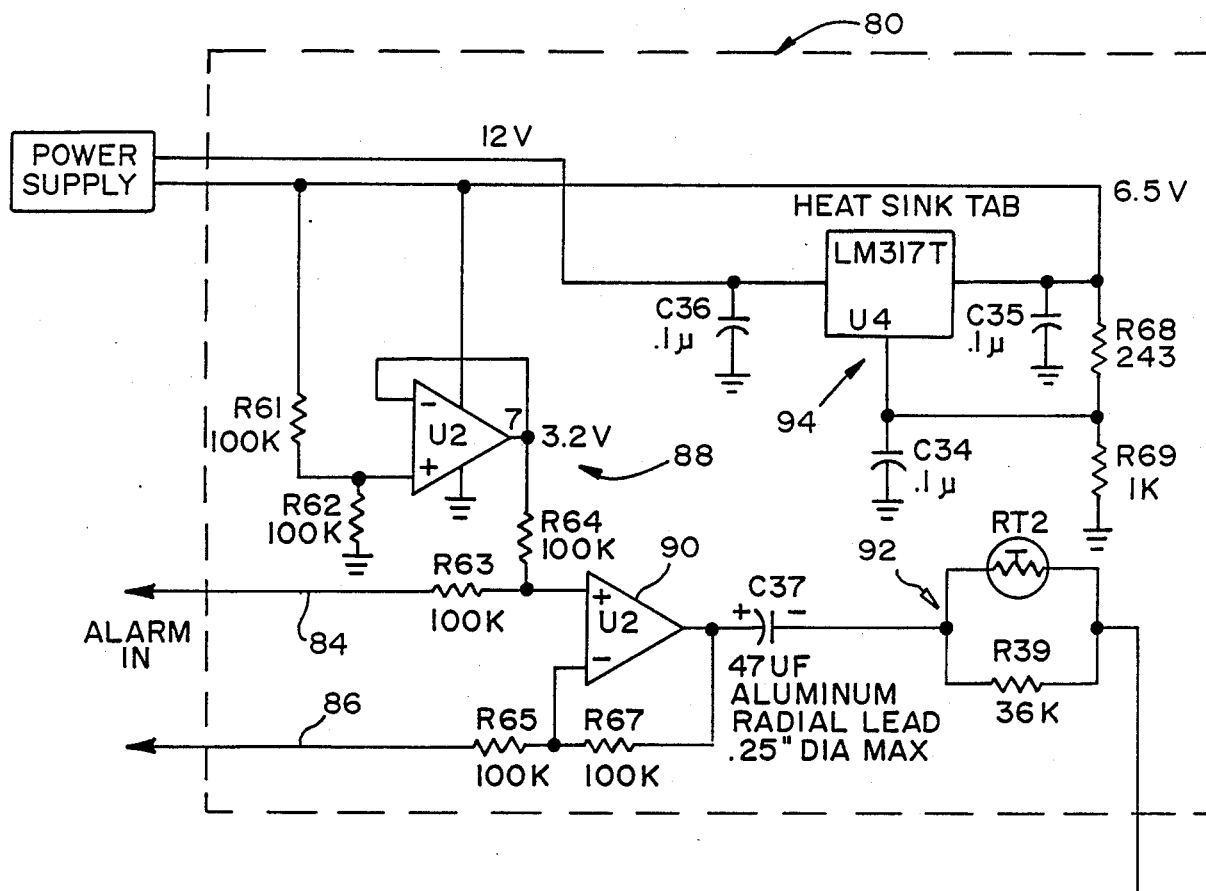
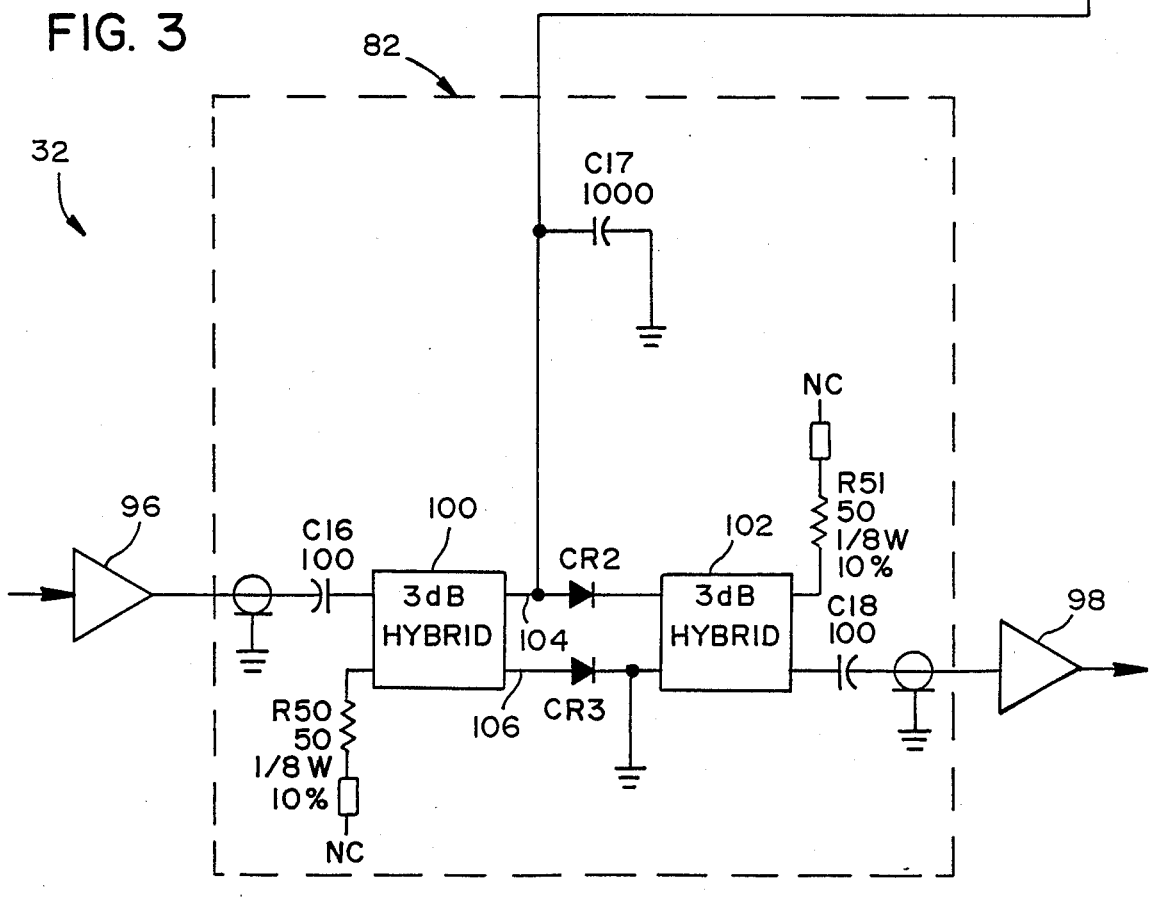
FIG. 3

COMMUNICATIONS REPEATER MONITORING SYSTEM

FIELD OF THE INVENTION

This invention relates to communication systems having remote repeater units, and in particular to such systems wherein characteristics associated with the repeater location are monitored.

BACKGROUND AND SUMMARY OF THE INVENTION

In recent years there has been an increase in the use of microwave communication systems, particularly in dedicated and cellular mobile phone systems. Microwave transmission is very directional and often requires the use of a repeater station to receive a signal transmitted from a first terminal and to redirect it toward a second terminal where it is received.

Various forms of repeaters have been developed to handle this function. These include back-to-back antennas, double passives, regenerative repeaters and RF repeaters. Repeaters typically convert the radio frequency signal to an intermediate frequency or baseband during signal processing. RF repeaters however perform signal amplification directly at radio frequency.

In order to properly maintain a communication system it is important to know the condition of key elements of the system, such as power supply, amplifier operation and site security. Transducers attached to appropriate items in and around a repeater site are used to generate raw monitor signals of the repeater operation. In repeaters which convert the signal to an intermediate or baseband frequency, these monitor signals can be added to the communication signal. In RF repeaters this is not possible because the communication signal is maintained as an RF signal.

The present invention overcomes this inherent inability to apply a monitor or alarm signal to the communication signal at an RF repeater location. It does this by modulating the communication signal with a monitor signal, preferably of low frequency and amplitude.

This feature is provided by a monitoring system comprising means for generating a signal representative of the desired characteristic to be monitored. Also included are means responsive to the generated signal for producing a modulating signal representative of the generated signal and having a frequency substantially less than the communication signal carrier frequency. Means are also provided for modulating the amplitude of the communication signal with the modulating signal, whereby the retransmitted communication signal is representative of the desired characteristic.

The invention also includes a method for performing these functions. In the preferred embodiment, the method includes (a) receiving the communication signal at a repeater unit; (b) generating simultaneously a plurality of signals representative of the status of a corresponding plurality of operating conditions of the repeater unit; (c) time multiplexing the respective status signals to form a combined signal; (d) encoding the combined signal to form a digital signal of frames of data having a frequency substantially less than the communication signal carrier frequency, with a frame being formed of data from each of the status signals; (e) varying the level of the communication signal proportionally with the value of the digital signal; (f) retransmitting the level-varied communication signal from the repeater unit; (g) receiving the retransmitted communication signal at a receiver unit remote from the repeater unit; (h) generating a control signal representative of the signal level of the retransmitted communication signal; (i) amplifying the received retransmitted communication signal inversely proportionally with the value of the control signal for maintaining the value of the amplified retransmitted communication signal at a substantially constant level; (j) regenerating the digital signal from the control signal; and (k) decoding the regenerated digital signal into a plurality of output signals corresponding to and representative of the original operating-condition-status signals. Apparatus for performing three steps are also within the contemplation of the present invention.

It will thus be appreciated that the present invention provides a method and apparatus for monitoring characteristics such as are associated with a repeater unit and modulating the communications signal at the repeater unit with the communication signal still at its transmission frequency to add the monitor information to the signal, and then separate the monitor signal from the communication signal at a receiver terminal. Thus, monitor information is transmitted to a remote terminal for providing status information about the repeater or other information in a manner which is reliable and inexpensive to accomplish.

These and other features and advantages of the present invention will become apparent from a review of the drawings and the following associated detailed description of the preferred embodiment.

BRIEF DESCRIPTION OF THE DRAWINGS

FIG. 2 is a block diagram of the monitoring system of FIG. 1.

FIG. 3 is a circuit schematic showing the alarm modulator driver and amplifier modulator of FIG. 2.

DETAILED DESCRIPTION OF THE PREFERRED EMBODIMENT

Figure 1:
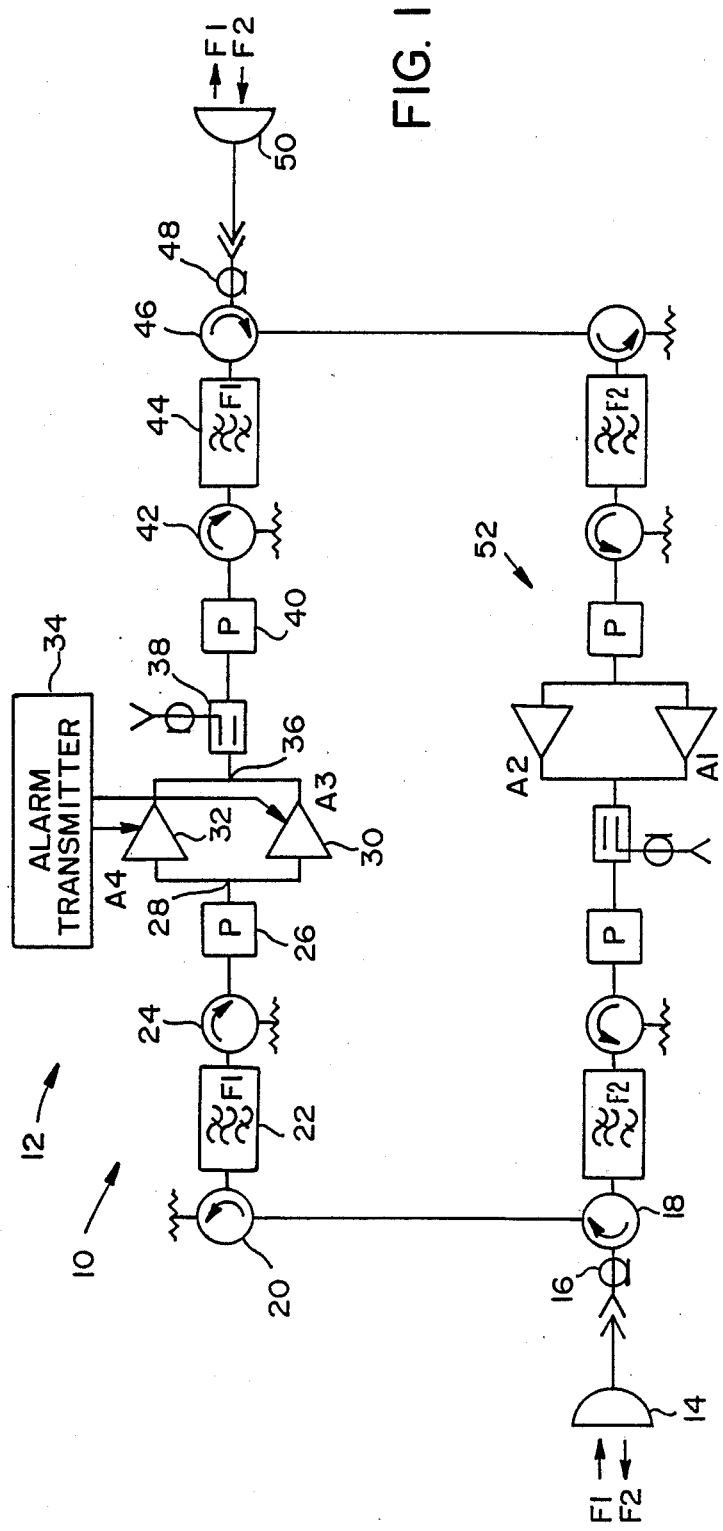
FIG. 1 is a block diagram of a repeater unit with a monitoring system according to the present invention.

Referring initially to FIG. 1, a radio frequency repeater unit 10, such as is available from Peninsula Engineering Group of San Carlos, Calif. and having a frequency range of 1.700 to 2.300 GHz with a 56 dB nominal gain, is shown modified to form a monitoring system 12 made according to the present invention.

A communication signal having a carrier frequency F1 and being modulated by a communication modulating signal is received on an antenna 14 and enters the repeater unit 10 via a type N (F) connector 16 from which it is fed to a branching circulator 18. From circulator 18, the F1 signal is passed to an isolator 20 and then to an F1 bandpass filter 22. The bandpass filter passes the F1 signal to a second isolator 24 and an F1 receive pad 26.

The receive pad reduces the repeater receive signal to approximately the recommended input level which, for the repeater unit indicated, is −39 dBm digital or −32 dBm analog.

After the receive pad, the signal passes through a power splitter represented by the junction 28 to parallel amplifiers 30 and 32. The gain of amplifiers 30 and 32 is modulated by a modulating monitor and alarm signal received from an alarm transmitter 34. The amplified signal passes through an output power combiner 36 and an F1 calibrated directional coupler 38 to an F1 transmit pad 40. The transmit pad reduces the output signal level of the repeater unit to prevent overloading of the terminal receiver in a short path.

From transmit pad 40 the F1 signal passes through another isolator 42 and another F1 bandpass filter 44 to a second branching circulator 46. From this circulator the signal passes through a type N (F) connector 48 for connection to a second antenna 50.

A second communication signal F2 is also received on antenna 50 and passes through a path shown generally at 52 which, as can be seen, is substantially the same as that described for signal F1 except that there is no alarm transmitter on either of the two corresponding amplifiers. This is because it is typically sufficient to have a single monitoring and alarm signal directed to a single receive transmitter. It may be desirable to have such a signal directed to both receive terminals, in which case the alarm transmitter 34 could be additionally coupled to the two amplifiers associated with path 52. Signal F2 is retransmitted from antenna 14.

Alarm transmitter 34 is shown in block diagram form in FIG. 2. In this the preferred embodiment, seventeen alarm and monitor inputs are provided. For the single repeater unit described with reference to FIG. 1, eight monitor signals provide the basic information needed. This leaves six which may be used for other purposes. For instance, if a second repeater unit exists at the same site, monitor signals from that unit may be transmitted using alarm transmitter 34. The monitor and alarm signals shown are for two repeater units.

A series of transducers represented generally at 54 generate monitoring signals which are fed into an alarm input interface 56. Beginning at the top of the transducer list, signals are generated for failure of amplifiers 1 or 4, indicated as amplifiers A1 and A4 in FIG. 1, failure of amplifiers 2 or 3, opening of the repeater cabinet door, failure of the waveguide pressure, F1 through F4 power level failure (with F3 and F4 relating to a second repeater unit), failure of amplifiers 5 or 8 and 6 or 7 (for the second repeater unit), two uncommited signals, and failure of each of two batteries A and B (as analog voltage level signals). A temperature sensor 58 also provides an analog signal to an analog to digital (A/D) converter 60.

Amplifier status is monitored through the use of a current comparator circuit. As a general rule, when there is a problem in an amplifier the current drain will either increase or decrease. An alarm is provided if the current drain on any one of the amplifiers is significantly different than the others. The failure of the respective amplifiers is determined by a combination of the power level and amplifier signals. For instance, if the monitor signals for amplifiers 1/4 and power of the F1 signal both show failure, this indicates amplifier 4 failed. But if the monitor signal for F2 power showed failure, then it would indicate amplifier 1 failed.

The two battery signals pass through interface 56 to a select circuit 62. The select circuit selects alternately one of the two signals for passage through an A/D converter 64 to a parallel-to-serial and framing circuit 66. The twelve signals other than the battery signals input into interface 56 are divided into A and B groups and fed out sequentially to respective data select A and B circuits 68 and 70. The corresponding data is then fed to framing circuit 66. The output of A/D converter 60 is also fed to circuit 66.

The two data A and B signals from interface 56 are also preferably connected to an LED display 72 which is activated by a manual switch 74. This display and switch are mounted at the repeater site so that the status of the various monitoring signals also can be checked locally. When the switch is closed, the display lights all light up momentarily and then only those showing an alarm condition remain on. Thus the function of the individual lights are verified. Also, by making the lights operational only upon the closing of the manual switch, power is not normally required to operate the display, thereby substantially reducing the amount of power consumption of the monitoring system.

Interface 56 functions as a digital encoder. Upon receipt of a specified alarm threshold at any of the repeater alarm inputs or open/close at an unspecified input, such as UC 5 or UC 6, the alarm input interface converts the analog information into a true/false digital signal. The digital output signal from the alarm interface, as has been mentioned, is applied to one of two data selectors 68 and 70. The two selectors alternately transmit A data and B data to framing circuit 66 which converts the signals into a serial string and adds framing bits to form a 16 bit word.

Inputs for Batteries A and B are converted into an eight bit word at converter 64 before being fed into framing circuit 66. Sixteen seconds are required to update each of the battery voltage readings at the receiver site.

Battery temperature telemetry follows a path similar to that of battery voltage. Eight seconds are required to update the battery temperature readings at the receiver site.

The signal from framing circuit 66 is then Manchester encoded at an encoder 76 to have a signalling rate of 32 baud per second.

This rate is chosen to keep the monitor modulating signal on the communication signal below the minimum communication modulating signal. If the communication modulating signal is impressed on the communication carrier signal using analog frequency modulation, the minimum communication modulating signal frequency is typically about 100 Hz. If digital amplitude modulation is used, the minimum communication modulating signal frequency is about 0.5 MHz. Frequencies higher than the minimum communication modulating signal can be used, but this introduces noise to a greater degree in the communication signal.

The encoded signal then receives amplification and shaping at a circuit 78 after which it is applied to the RF line through amplifiers 30 and 32 via a modulator driver 80, and a modulator circuit 82 in each amplifier.

Figure 4:
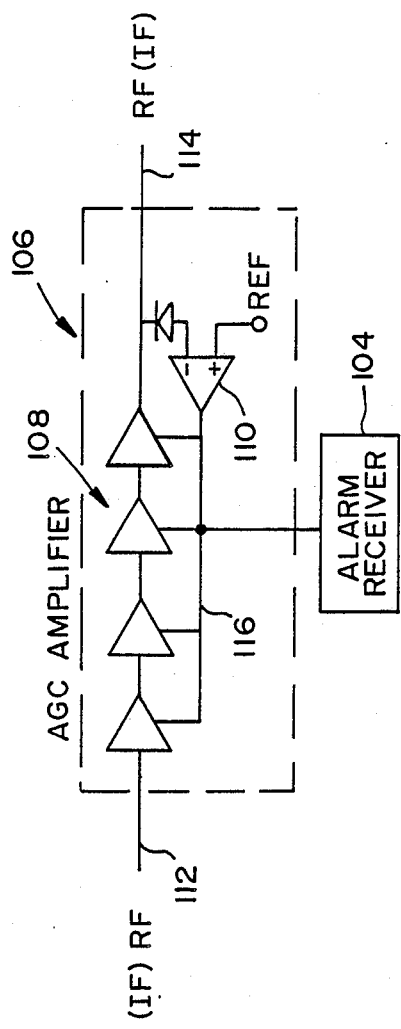
FIG. 4 is a block diagram of a terminal receiver AGC amplifier and alarm receiver made according to the present invention.

The encoded signal is shaped to have rise and fall times generally not greater than 1 dB/10 msec. The reason for this is that the classical fast fade rate which occurs naturally in transmitted signals is at this rate. Thus, the automatic gain control system to be described with reference to FIG. 4 is designed to respond to received signals which have rise and fall times of 1 dB/10 msec or less. The signal is applied to the RF line with a six percent amplitude modulation, or one dB peak-topeak. The slow data speed and low level modulation insures that the monitoring system will not interfere with normal radio link performance of virtually any type of analog or digital microwave radio.

FIG. 3 is a circuit schematic of modulator driver circuit 80 and modulator 82. The encoded digital monitoring signal is received across conductors 84 and 86. The voltage on conductor 84 is given a reference value by a biasing amplifier 88. The balanced signal on the two conductors is then applied across the noninverting and inverting inputs of operational amplifier 90 to reduce the signal to a single lead. The signal then passes through a d.c. blocking capacitor C37 to a resistance circuit 92. Circuit 92 includes a resistor R39 in parallel with a thermistor RT2.

In the preferred embodiment, the repeater units each have temperature-compensating circuits to maintain the gain sensitivity (volts/dB) of the in-line amplifiers for different operating temperatures. The parallel circuit of thermistor and resister vary the signal level of the modulating circuit so that a consistently proportional signal level change is produced on the RF communication signal. That is, a 1 dB peak-to-peak modulating signal is maintained over the operating temperature range. If the temperature compensating circuit does not exist, the thermistor is not required.

A heat sink voltage regulator circuit 94 also is provided to stabilize the voltage, and thereby provide d.c. isolation of any external load changes.

The output of modulator driver circuit 80 is a modulating signal which is applied to modulator 82. Modulator 82 is positioned between individual amplifiers 96 and 98 forming part of general amplifier 32. The communication signal is split between a couple of 3 dB hybrid circuits 100 and 102 on two conductors 104 and 106. Each of these conductors has a diode CR2 or CR3 connected in series as shown. The modulating signal is connected to the anode side of diode CR2. The cathode side of diode CR3 is connected to ground to form a path for the diode biasing current to ground. The level of the signal connected to diode CR2 controls the operating state of the diodes, which thereby function as variable resistances. The temperature compensating signal (not shown) is also applied to diode CR2. Thus, the communication signal is modulated by the modulating signal since the net gain of amplifier 32 is varied by the amount of attenuation produced by the modulating signal.

Other methods of modulation will also be recognized as being possible. For instance, the diodes could be connected in shunt to ground, other types of variable impedances could be used, or the actual gain of one of the individual amplifiers could be varied.

The alarm and monitoring telemetry is recovered at a terminal site by an alarm receiver 104 connected to a radio automatic gain control (AGC) circuit 106, as shown in block diagram in FIG. 4. The AGC circuit includes a series of amplifier stages shown generally at 108. The received communication signal appears as input to the amplifiers on a conductor 112. A comparator 110 receives the amplified communication signal from the output 114 of the cascade of amplifiers at the inverting input. This input is compared to a reference on the noninverting input. This reference represents the desired constant signal level.

Comparator 110 generates a feedback control signal on a pair of conductors 116 at its output, which controls the gain on the amplifiers to provide a relatively constant communication on their output signal at 114.

As mentioned previously, the AGC control signal in this preferred embodiment is representative of the variation of the level of the received communication signal typically due to natural fading during transmission. This fading shows up as signals having rise and fall times not greater than the classical fade rate of 1 dB/10 msec. Since the monitor communication signal has a frequency less than this rate, it appears in the resulting AGC control signal.

Figure 5:
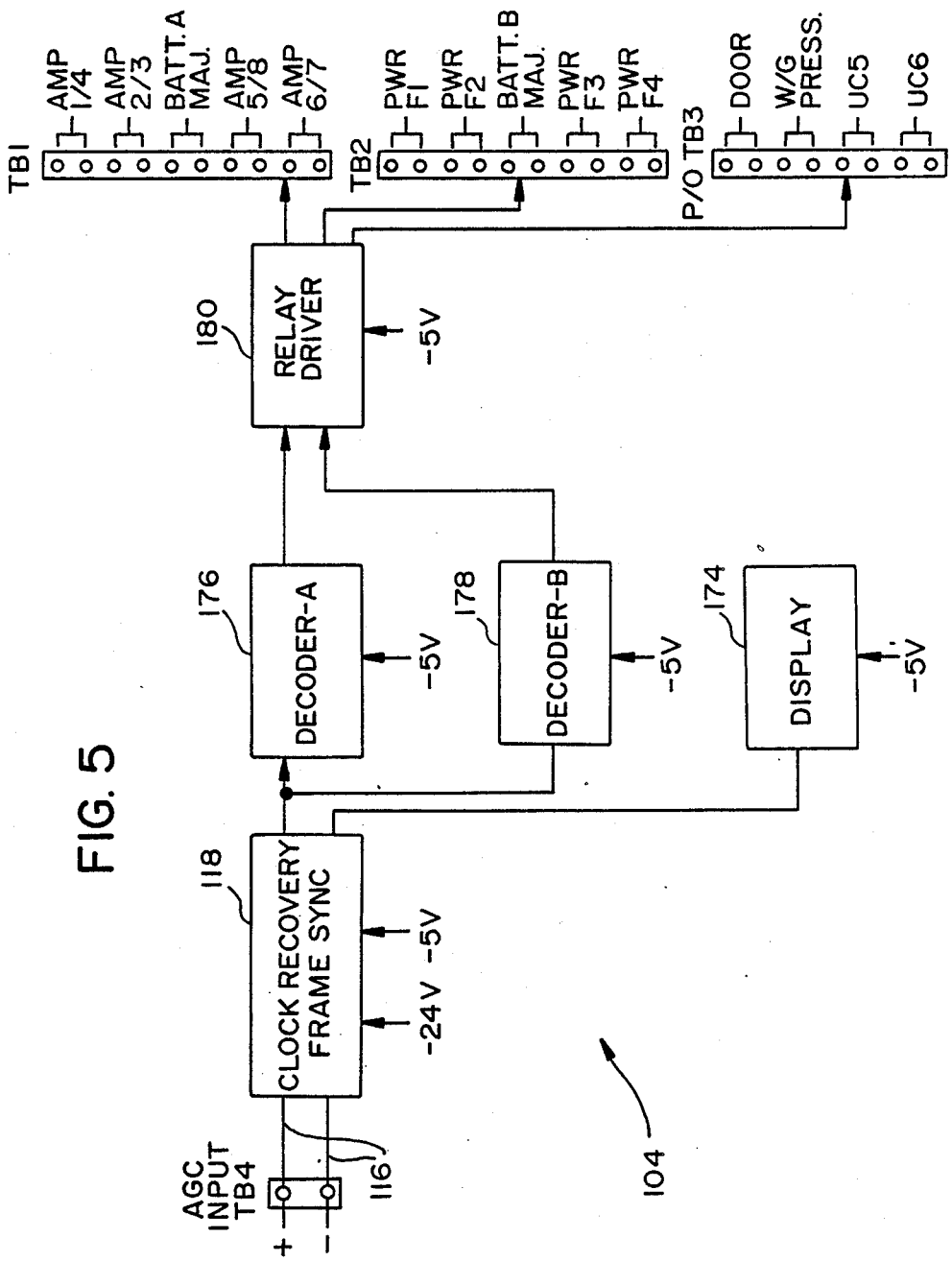
FIG. 5 is a block diagram of the alarm receiver of FIG. 4.

FIG. 5 illustrates alarm receiver 104 in block diagram form. The conductors 116 are connected to a clock recovery and frame sync circuit 118, shown in further detail in FIGS. 6A–6G. Circuit 118 recovers symbol timing and data. Referring to FIGS. 6A–6G, the control signal on conductors 116, labelled as inverting and noninverting on FIG. 6C, are input through a series of filtering capacitors C33, C34, C37 and C38 to an operational amplifier 120. Amplifier 120 converts the two-lead signal to a single lead signal on conductor 122. This signal is converted from an analog signal to a digital signal on a conductor 124 by a comparator 126. The output of comparator 126 toggles positive and negative relative to the reference voltage on the noninverting input. A 5 volt zener diode CR1 converts the digital signal levels to TTL logic levels.

Figure 6A:
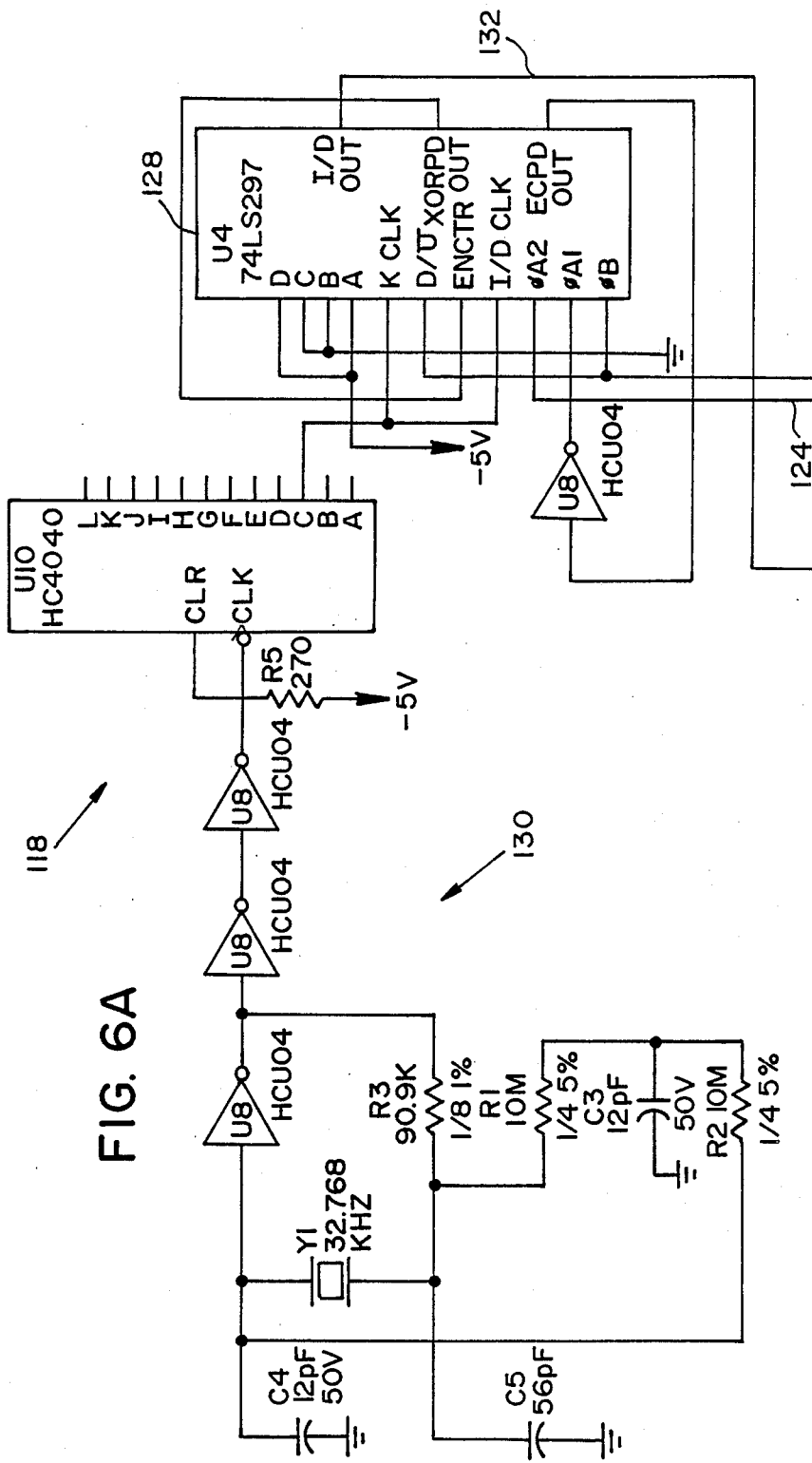
FIGS. 6A–6G are a set of figures which form in combination the circuit schematic for the clock recovery and frame sync circuit of FIG. 5.
Figure 6B:
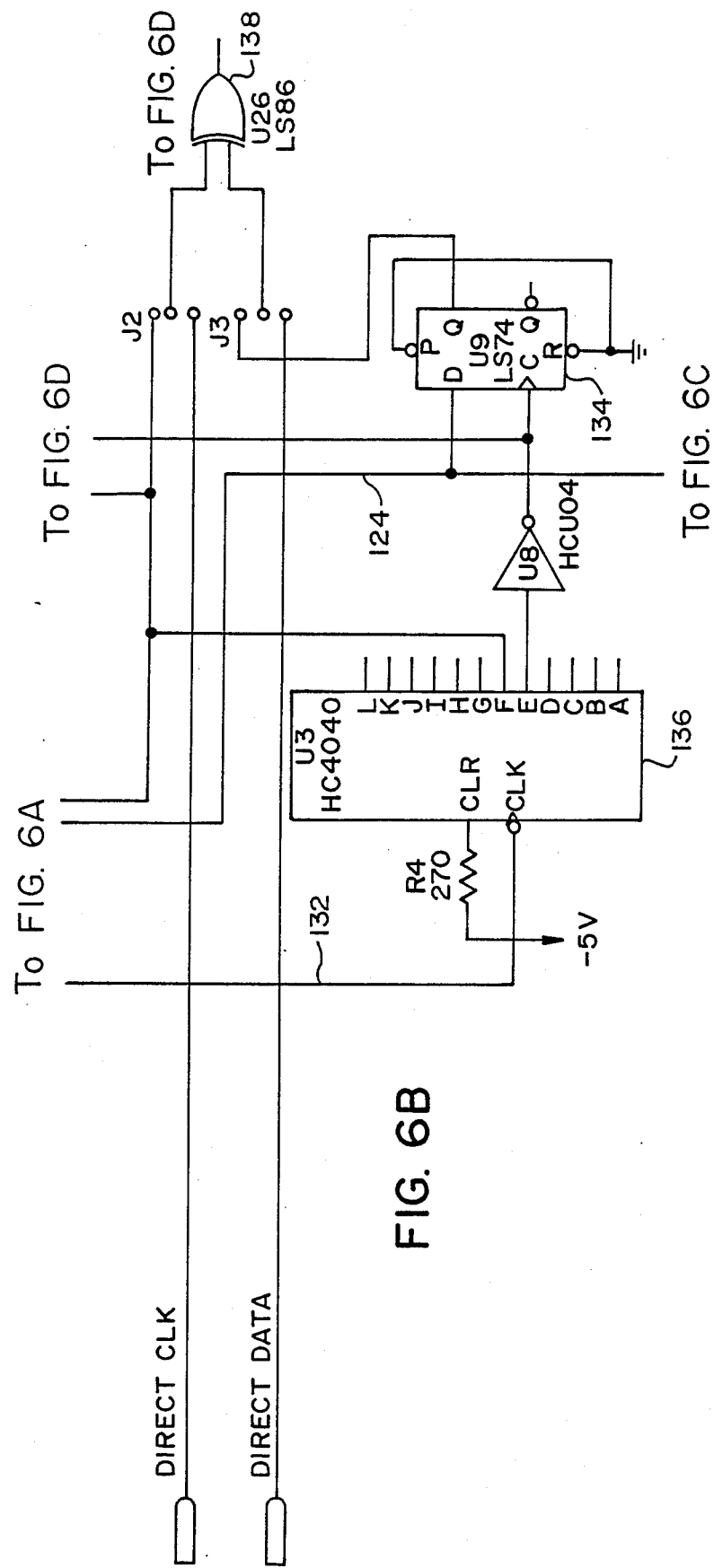
Figure 6C:
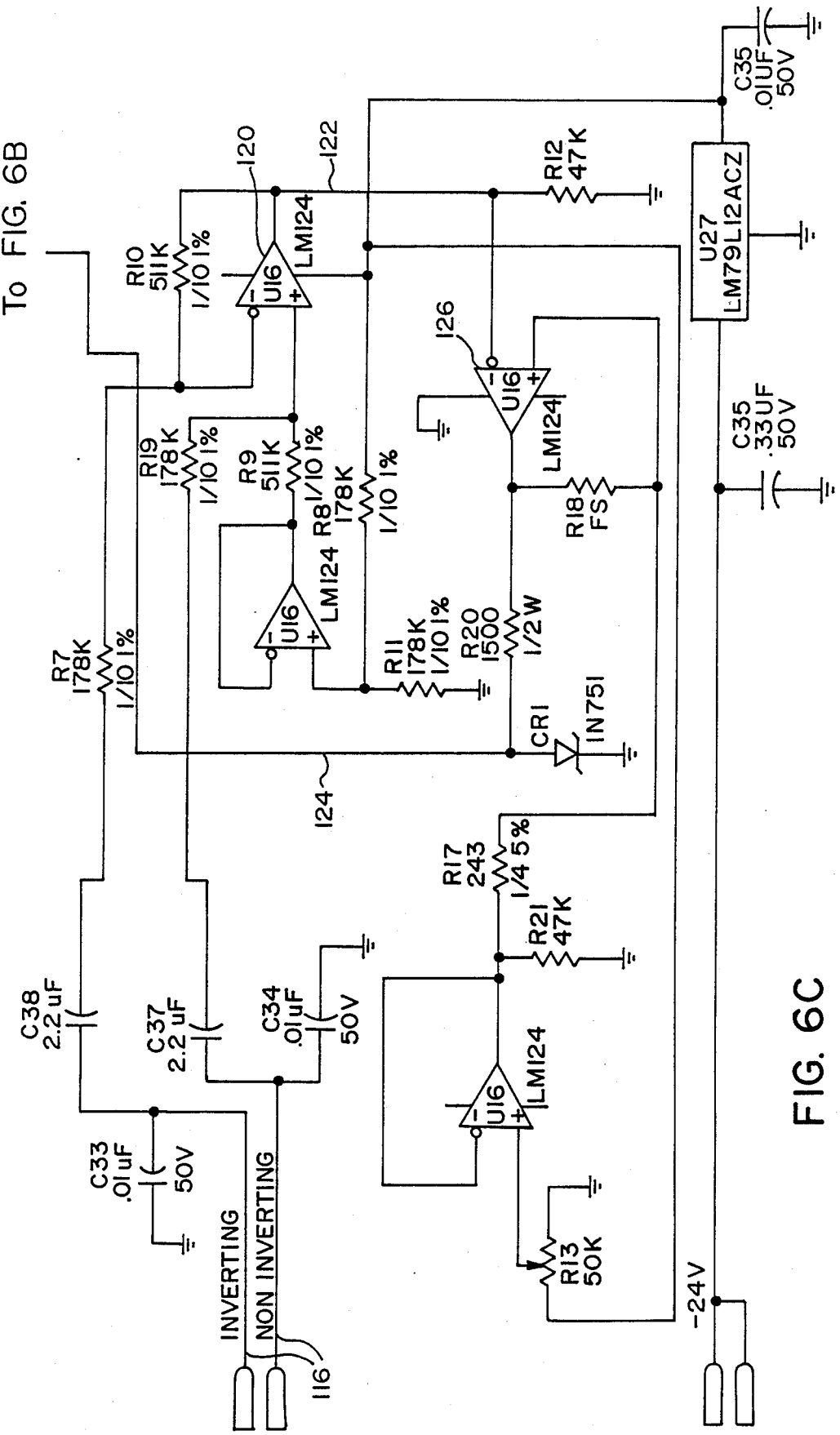
Figure 6D:
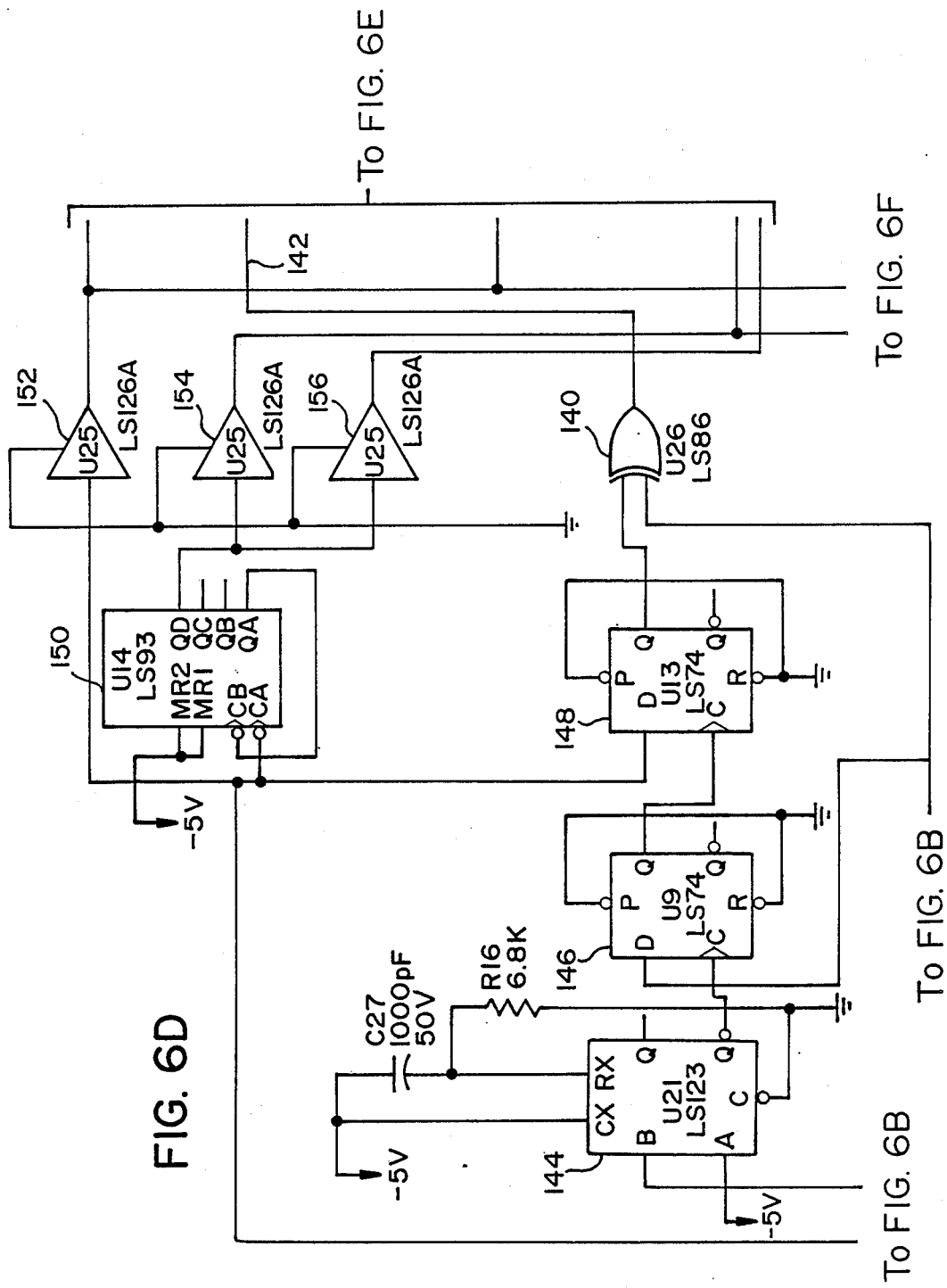
Figure 6E:
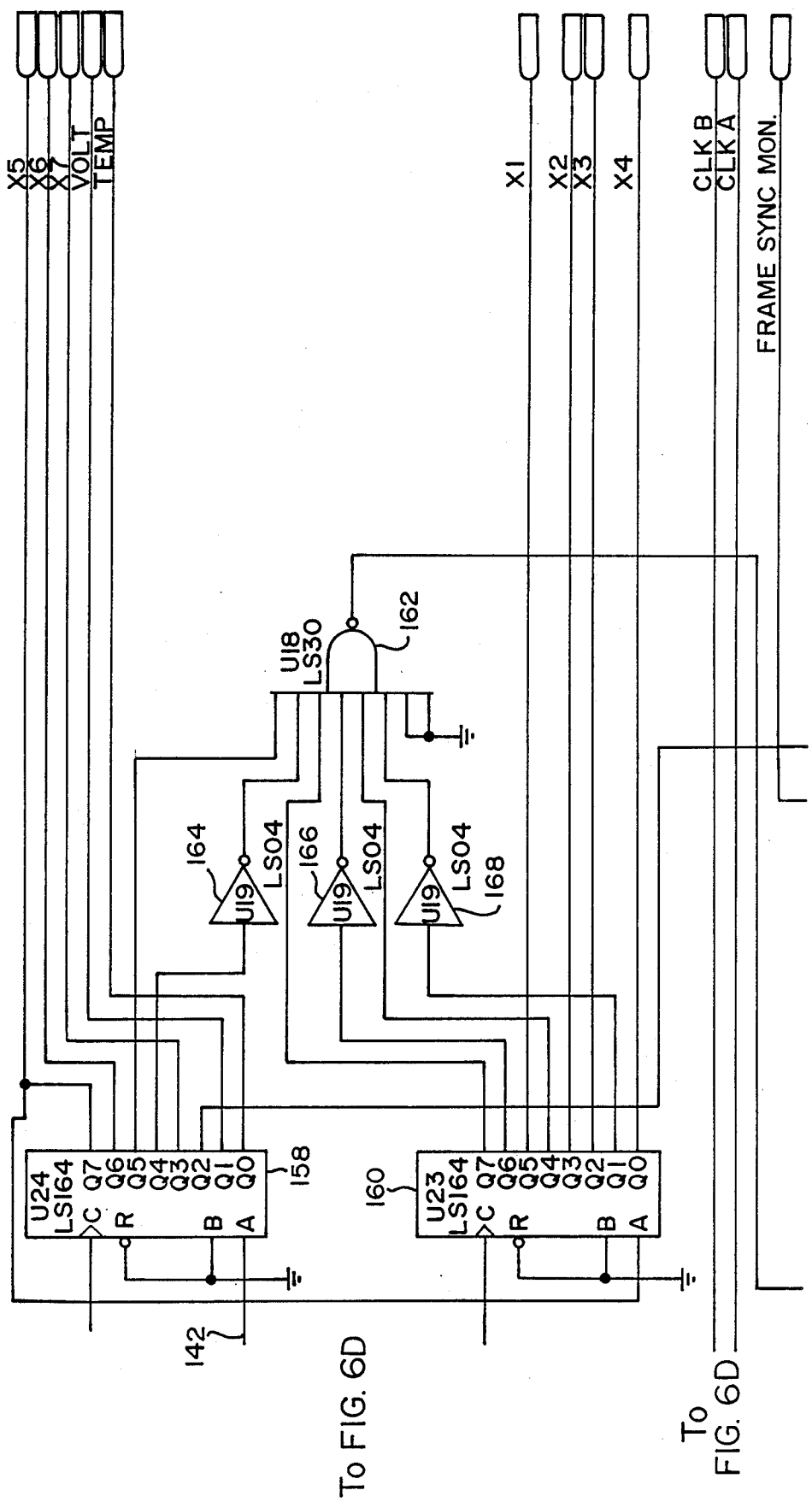
Figure 6F:
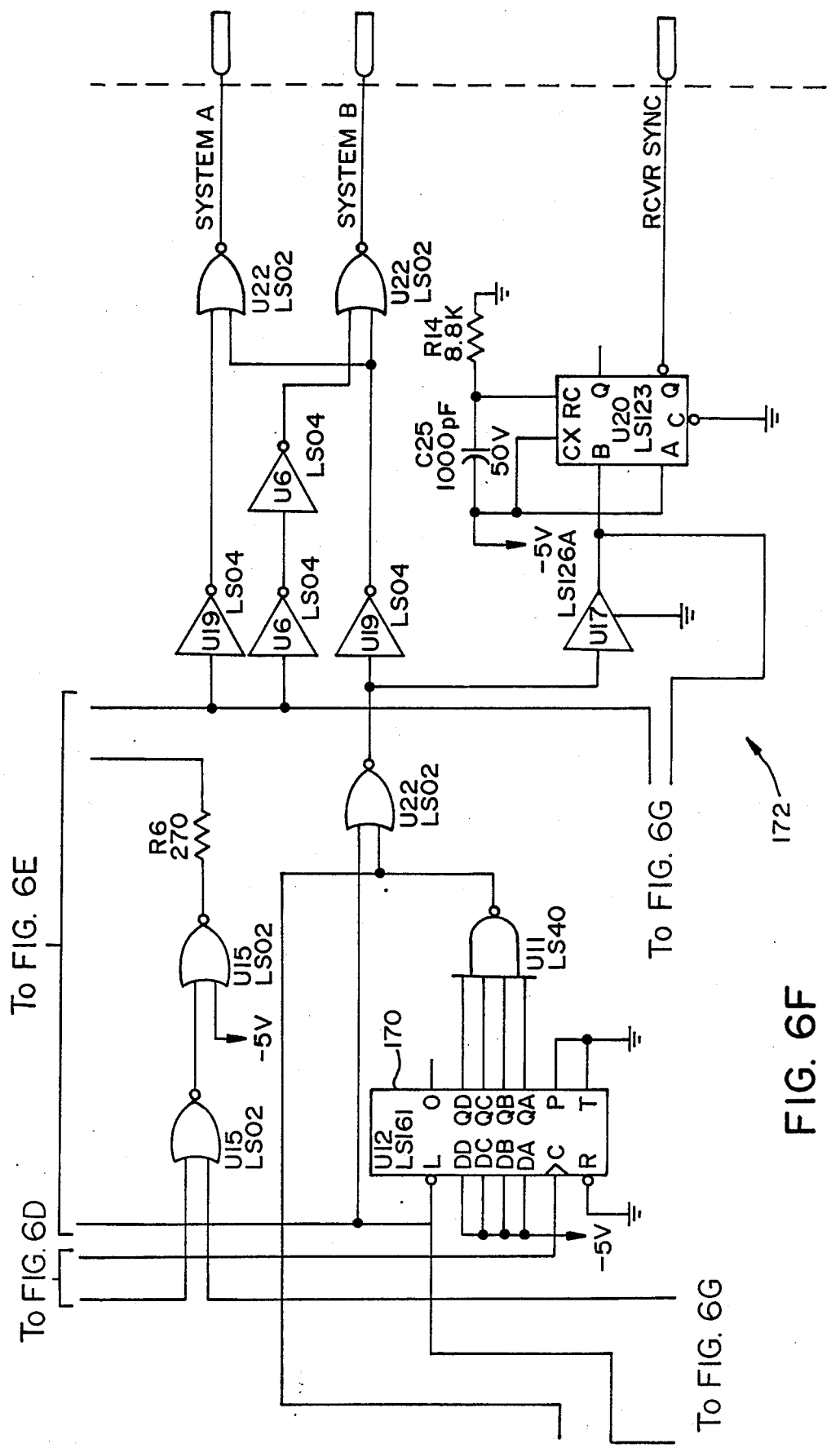
Figure 6G:
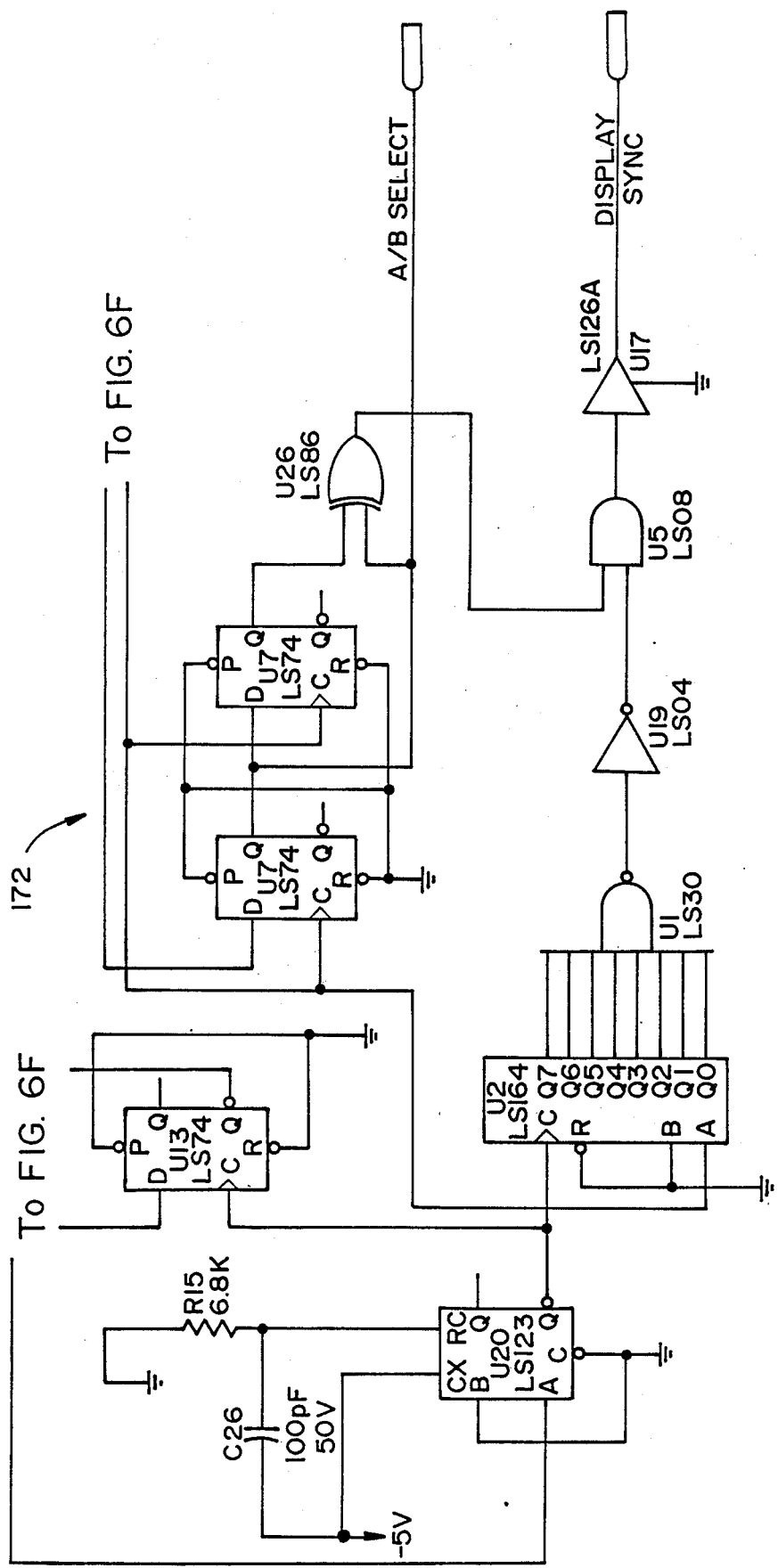

The digital signal on conductor 124 is connected to the A2 input of a phase lock loop (PLL) circuit 128, shown in FIG. 6A. This circuit also receives a 32 Hz clocking signal from a clock circuit shown generally at 130, which is driven by crystal oscillator Y1. PLL circuit 28 compares the digital data to the clock data to recover the clock signal from the digital data. The synchronized clock signal is then output from circuit 128 on a conductor 132. As shown in FIG. 6B, the clock signal clocks a D-flip-flop 134 via a divider circuit 136. The "D" input to the flip-flop is the data signal on lead 124. The resulting output of the flip-flop is the reconstructed data with the Manchester encoding removed. This data is fed through exclusive OR gates 138 and 140 to a conductor 142 shown in FIGS. 6D and 6E.

A series of three flip-flops 144, 146 and 148 along with gates 138 and 140 determine whether the clock is out of phase with the data, and if so, inverts the clock so that the data out of gate 140 is phase corrected and in a NRZ data stream.

A binary counter 150 and associated tristate buffers 152, 154 and 156 serve as a buffered clock to break the frame into pieces corresponding to the timing of the data in the frame. The outputs of buffers 152 and 156 become clock signals B and A, respectively, as identified in FIG. 6E. The output of buffer 154 clocks parallel-to-serial shift registers 158 and 160. These shift registers provide the separated alarm signals as the outputs shown in FIG. 6E.

A NAND gate 162 in conjunction with inverters 164, 166 and 168 identify the framing bits and locks onto the framing timing. It is used to reset a counter 170. This counter counts to 16 for identifying the data to send on the outputs shown in FIG. 6E. The remaining circuitry shown generally at 172 in FIGS. 6F and 6G generally speaking provides timing circuitry to identify the timing between "A" and "B" subsets of data and to generate control signals for the connecting of the proper data signals to the monitor displays. Also included are the generation of display signals indicating that sync exists. If sync is lost, the displays are held at the las valid reading until sync is reestablished.

Referring again to FIG. 5, the extracted battery voltage and temperature data are applied to an appropriate serial-to-parallel converter in a display driver module 174. These signals are then decoded and displayed in the appropriate display panel in a three digit format representing voltage in volts and temperature in degrees Celsius.

Alarm input signals are applied to decoder A circuit 176 or B circuit 178 as appropriate. Each decoder circuit consists of a true data monitor, alarm status monitor, and LED alarm indicators. The "true data" decision is based on the receipt of three consecutive data bits. When three data bits are identical, the alarm status monitor compares them to the alarm and nonalarm conditions. The status of these alarms points is then displayed by LED indicators. A flashing LED for any alarm input is an indication of a change of status. An alarm indication is determined by pressing a reset switch. If the LED remains on after the switch is pressed, it indicates an alarm condition.

The alarm status information is also fed to a relay driver module 180 having dry contact relays. The outputs of the relay module are extended to a set of terminal blocks TB1, TB2 and TB3 as shown. These are for use if desired to connect the signals to other monitoring systems.

It can be seen that the present invention, particularly as embodied in the preferred embodiment just described, provides an alarm and monitoring system which is inexpensive to manufacture, easy to install, reliable, and further applies the monitoring information to the communication signal amplified by the repeater unit into which the monitoring information is fed. The types of transducers and information can be varied to suit any application. Further, it is a low power system so that it does not put a large load on the power supply associated with the repeater unit.

Thus, while the invention has been described with reference to a preferred embodiment, it will be appreciated by those skilled in the art that variations may be made without departing from the spirit and scope of the invention as described in the claims.

We claim:

1. In a communication system having a repeater unit for receiving and retransmitting a communication signal having a predetermined carrier frequency, a monitoring system for monitoring a desired characteristic at the repeater unit comprising:
   means for generating a signal representative of the desired characteristic;
   means responsive to the generated signal for producing a monitor modulating signal representative of the generated signal and having a frequency substantially not equal to the communication signal carrier frequency; and
   means for modulating the amplitude of the communication signal with the monitor modulating signal, whereby the retransmitted communication signal is representative of the desired characteristic, said modulating means comprising amplifier means having a net gain which varies with the temperature of said amplifier means, for amplifying the communication signal, means for varying the net gain of said amplifier means in response to said monitor modulating signal, means for varying the net gain of said amplifier means in a manner compensating for the change in net gain due to temperature change, and means for varying the level of the monitor modulating signal in response to temperature changes in said amplifier means for maintaining the ratio of the signal level of the monitor modulating signal to the signal level of the communication signal substantially at a predetermined value.

2. In a communication system having a repeater unit for receiving and retransmitting a communication signal having predetermined carrier frequency, a monitoring system for monitoring a plurality of desired characteristics at the repeater unit comprising:
   means for generating signals representative of the plurality of desired characteristics;
   means responsive to the generated signals for producing a digital monitor modulating signal formed of an ordered serial concatenation of digital codes, each representative of one of the characteristics, and having a frequency substantially not equal to the communication signal carrier frequency; and
   means for modulating the amplitude of the communication signal with the monitor modulating signal, whereby the retransmitted communication signal is representative of the desired characteristics.

3. In a communication system having a repeater unit for receiving and retransmitting a communication signal having a predetermined carrier frequency, and a receiver means disposed at a location remote from the repeater unit, a monitoring system for monitoring a desired characteristic at the repeater unit comprising:
   means for generating a signal representative of the desired characteristic;
   means responsive to the generated signal for producing a monitor modulating signal representative of the generated signal and having a frequency substantially not equal to the communication signal carrier frequency;
   means for modulating the amplitude of the communication signal with the monitor modulating signal, whereby the retransmitted communication signal is representative of the desired characteristic;
   automatic gain control means disposed at the receiver means and responsive to the signal level of the communication signal received from the repeater unit for generating a control signal indicative of the level of the received communication signal; and
   means responsive to the control signal for generating an output signal representative of the desired characteristic.

4. In a communication system according to claim 3 wherein said automatic-gain-control means generates a control signal representative of received signals having rise and fall times not greater than one decibel per ten milliseconds, and said means for producing a monitor modulating signal produces the monitor modulating signal with rise and fall times not greater than one decibel per ten milliseconds.

5. A communication system transmitting a communication signal having a predetermined carrier frequency comprising:
   a repeater unit for receiving and retransmitting the communication signal comprising:
      means for generating simultaneously a plurality of signals representative of the status of a corresponding plurality of operating conditions of said repeater unit;
      means for time multiplexing the respective status signals to form a combined signal;
      means for encoding the combined signal to form a digital signal of frames of data having a frequency substantially less than the communication signal carrier frequency, with a frame being formed of data from each of the status signals;

variable attenuation means responsive to the digital signal for varying the level of the communication signal proportionally with the value of the digital signal such that the level is varied not more than approximately six percent of the level of the communication signal; and means for retransmitting the level-varied communication signal; and a receiver unit for receiving the retransmitted communication signal comprising:

an automatic gain control means responsive to the signal level of the received retransmitted communication signal for generating a control signal indicative of the level of the received communication signal;

means responsive to the control signal for regenerating the digital signal; and means responsive to the regenerated digital signal for decoding the regenerated digital signal into a plurality of output signals corresponding to and representative of the operating-condition-status signals.

6. In a communication system according to claim 5 wherein said automatic gain control means generates a control signal representative of received signals having rise and fall times not greater than one decibel per ten milliseconds, and said encoding means forms the digital signal to have rise and fall times not greater than one decibel per ten milliseconds.

7. In a communication system according to claim 5 wherein the communication signal also has a communication modulating signal impressed on the communication carrier signal, which communication modulating signal has a predetermined minimum frequency, said encoding means forms the digital signal to have a frequency generally less than the minimum frequency of the communication modulating signal.

8. A method of monitoring a desired characteristic at a communication repeater unit for receiving and transmitting communication signals having a predetermined carrier frequency comprising:

generating a signal representative of the desired characteristic;

converting the generated signal into a monitor modulating signal having a frequency substantially not equal to the carrier frequency and rise and fall times not greater than one decibel per ten milliseconds;

modulating the communication signal with the monitor modulating signal;

transmitting the modulated communication signal;

receiving the transmitted modulated communication signal at a receiver unit disposed remote from the repeater unit;

separating, as the monitor modulating signal, all signals from the transmitted modulated signal having rise and fall times not greater than one decibel per ten milliseconds; and converting the separated monitor modulating signal into an output signal representative of the desired characteristic.

9. A method of transmitting a communication signal having a predetermined carrier frequency comprising:

receiving the communication signal at a repeater unit;

generating simultaneously a plurality of signals representative of the status of a corresponding plurality of operating conditions of the repeater unit;

time multiplexing the respective status signals to form a combined signal;

encoding the combined signal to form a digital signal of frames of data having a frequency substantially less than the communication signal carrier frequency, with a frame being formed of data from each of the status signals;

varying the level of the communication signal proportionally with the value of the digital signal no more than approximately six percent of the level of the communication signal;

retransmitting the level-varied communication signal from the repeater unit;

receiving the retransmitted communication signal at a receiver unit remote from the repeater unit;

generating a control signal representative of the signal level of the retransmitted communication signal;

amplifying the received retransmitted communication signal inversely proportionally with the value of the control signal for maintaining the value of the amplified retransmitted communication signal at a substantially constant level;

regenerating the digital signal from the control signal;

decoding the regenerated digital signal into a plurality of output signals corresponding to and representative of the operating-condition-status signals.

10. A method according to claim 9 wherein said control signal generating includes generating a control signal representative of received signals having rise and fall times not greater than one decibel per ten milliseconds, and said encoding forms the digital signal to have rise and fall times not greater than one decibel per ten milliseconds.

11. A method according to claim 9 wherein the communication signal also has a communication modulating signal impressed on the communication carrier signal, which communication modulating signal has a predetermined minimum frequency, and said encoding forms the digital signal to have a frequency generally less than the minimum frequency of the communication modulating signal.

* * * * *